US005384177A

United States Patent [19]

Rissmann

[11] Patent Number: 5,384,177

[45] Date of Patent: Jan. 24, 1995

[54] PICTURE, PATTERN AND INFORMATION CARRIER AND METHOD FOR ITS PRODUCTION

[76] Inventor: Karl-Heinz Rissmann, Jakobinenstrasse 12-16, W-8510 Fürt, Germany

[21] Appl. No.: 962,432

[22] Filed: Oct. 16, 1992

[51] Int. Cl.[6] ........................ B32B 3/28; B65D 73/00; B29C 63/00

[52] U.S. Cl. ................................... 428/182; 428/34.3; 428/156; 428/172; 428/183; 428/187; 206/457; 206/459.1; 206/459.5; 206/484; 220/441; 493/58; 493/186; 156/196; 156/209; 264/167; 264/241; 264/284; 264/509

[58] Field of Search ............... 428/182, 156, 172, 183, 428/187, 34.2, 34.3, 141; 40/616; 206/49, 457, 459.1, 459.5, 484; 220/441, 670; 493/52, 58, 186; 156/196, 209; 264/167, 241, 284, 293, 299, 509

[56] References Cited

U.S. PATENT DOCUMENTS

| | | | |
|---|---|---|---|
| 1,189,140 | 6/1916 | Lane | 428/182 |
| 2,642,372 | 6/1953 | Chittick | 428/182 |

FOREIGN PATENT DOCUMENTS 481194 8/1929 Germany .

*Primary Examiner*—Donald J. Loney
*Attorney, Agent, or Firm*—Jordan and Hamburg

[57] ABSTRACT

A 2-dimensional carrier for picture, pattern and/or other information, produced from material, which is wavy or corrugated on its surface and the waves or currugations of which are pressed down or flat within or without contours, which are specified by the picture, pattern and/or the information.

32 Claims, 2 Drawing Sheets

PICTURE, PATTERN AND INFORMATION CARRIER AND METHOD FOR ITS PRODUCTION

BACKGROUND OF THE INVENTION

The invention relates to a 2-dimensional product, which serves as carrier for textual or pictorial representations, such as pictures, patterns and/or information, as well as to a method for its production. Such an information carrier can form, for example, an integral component of a receptacle, such as a carrier bag or paper bag.

Carrier or paper bags frequently are used as advertising carriers. Their exterior, wide sides are printed with advertising slogans, company names, trademarks, addresses, telephone numbers, etc., and, moreover, in as pleasing a coloration and conformation as possible. After all, such carrier or paper bags virtually represent a calling card for its user, that is, the ultimate consumer or person engaged in a trade or business. There is therefore a considerable need for finding further products or bodies, which serve as information carriers and can be designed from aesthetic points of view.

SUMMARY OF THE INVENTION

To solve this problem it is proposed pursuant to the invention for the initially named 2-dimensional carrier that it be produced from a material, which is wavy or corrugated on its surface and the waves or corrugations of which are pressed down or flat within or without contours, which are specified by the picture, pattern and/or information. The contours thus serve as demarcation or boundary lines, within or without which the embossing for producing the desired pattern in the wave structure is to be carried out. The contours correspond to the picture, pattern, etc., which is to be reproduced.

Pursuant to the invention, the representations, which are to be reproduced, are embossed in a ribbed or corded surface structure. The information, which is to be reproduced for the human eye, arises out of the difference between the embossed pattern and the otherwise regular surface structure, it being possible to achieve an original and aesthetically pleasing appearance. Within the scope of the invention, the pattern can be embossed positively as well as negatively. Positive means that those areas of the wavy, corrugated or ribbed surface structure, which are to reproduce the picture, pattern or information, are depressed. Negative embossing means that the wave peaks in the surface region intended for the reproduction are largely not processed and have been left untouched, while the regions adjoining them and separated by contours, are depressed.

It is of benefit for the clear and sharp reproduction of information and identifiability of the embossed pattern if, in a further development of the invention, those waves or corrugations, which are not pressed flat or down, are provided with a color, which contrasts with their adjoining surroundings, at least on their (upper) crests or apexes. For example, if inexpensive, marketable corrugated board, which is brown as such, is used as the production material, the wave crests, which have remained standing after the pattern is embossed, are coated, for example, with a green color. By these means, the pattern, which is to be reproduced, appears to have particularly sharp contours.

A production method for said carrier, which lies within the scope of the invention, consists therein that a flat body with a wavy or corrugated surface, such as corrugated board or sheet metal, is totally or partially pressed mechanically with an embossing tool, such as a pressure piston or an embossing block. The picture, pattern or information is reproduced on the embossing tool in a positive or negative manner, as explained above. A further development of the manufacturing process, which serves to provide the carrier, as mentioned, with a contrasting color, consists therein that, after the pressing process, the corrugation crests or wave crests of the flat body are subjected to a mechanical coloring process. The coloring process can consist, for example, of a dye bath, into which the embossed flat body is immersed only partially. Alternatively, a roller, on the periphery of which a coloring block is mounted, can also be caused to rotate, the embossed flat body slightly touching the coloring block as it is moved past the roller.

Finally, it is within the scope of the invention to use said information carrier as an integral component of receptacles or packaging of any type; in particular, the carrier or flat body can form one or several external sides of a carrying or paper bag, the desired picture or pattern being embossed in the corrugated material of the bag and the still remaining wave crests being provided with contrasting colors.

BRIEF DESCRIPTION OF THE DRAWINGS

Further details, characteristics and advantages on the basis of the invention arise out of the subsequent description of a preferred embodiment of the invention as well as of the drawing, in which.

DESCRIPTION OF THE PREFERRED EMBODIMENTS

Figure 1:
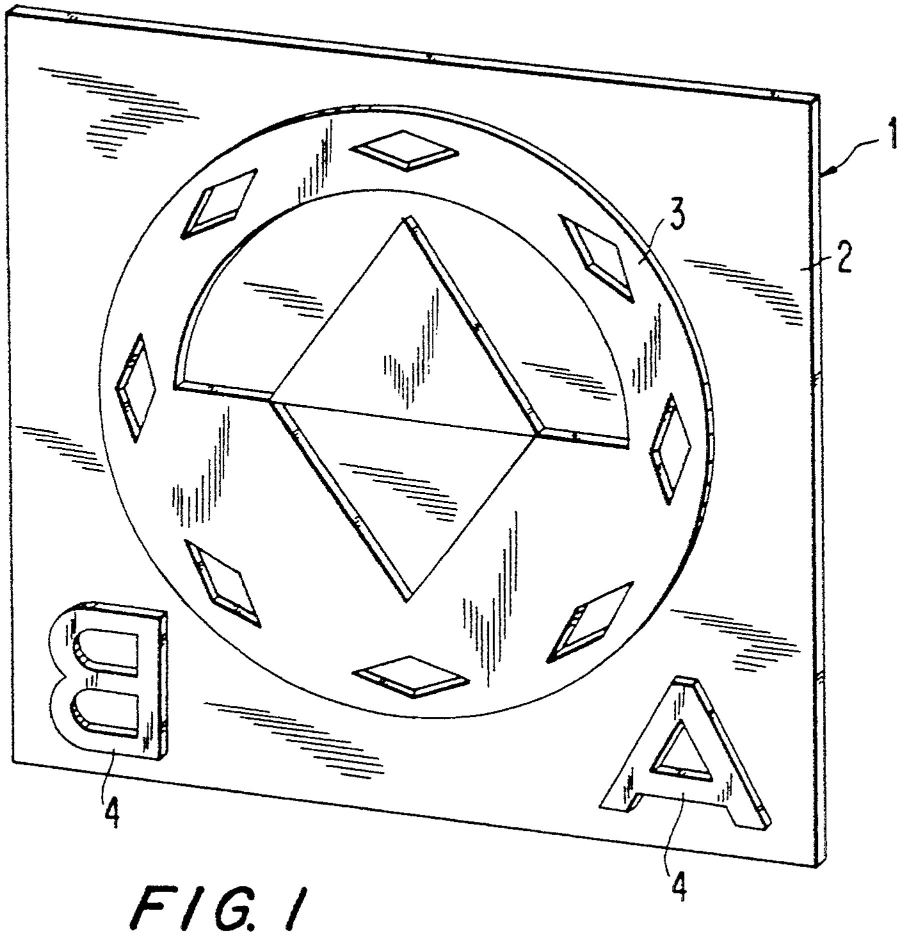
FIGS. 1 to 3 show an embossing block, a printing or pressing machine as well as a coloring roller for producing the inventive product.

In FIG. 1, a perspective representation of an embossing block 1 is shown, on the base plate 2 of which the shapes (pattern 3, letters 4), specified on the basis of the information that is to be reproduced, are elevated or raised relative to the areas that have not been embossed. The embossing block 1 thus represents a (positive) letterpress printing form, which works according to the principle of stamp printing.

Figure 2:
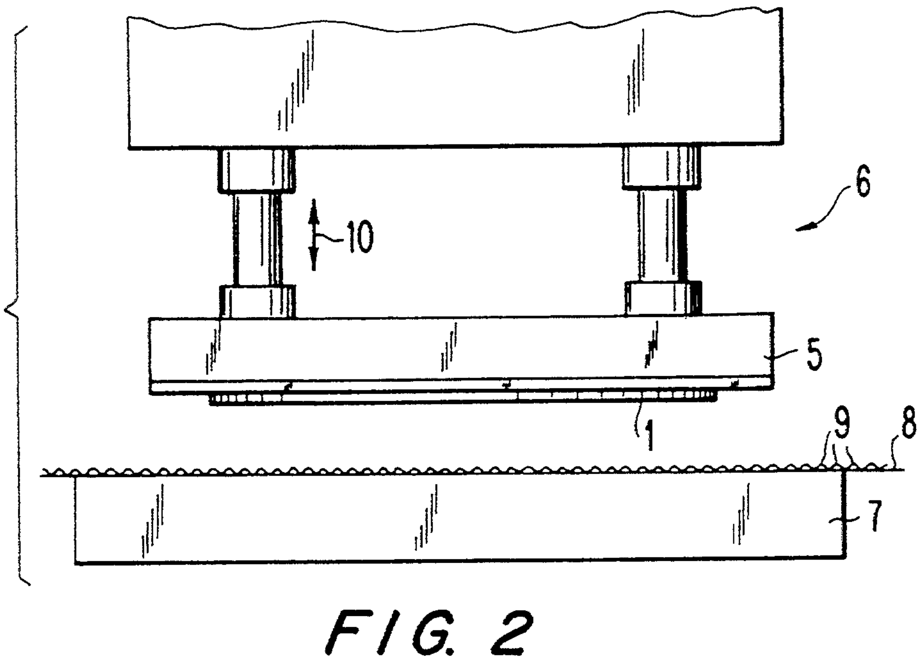

This is evident from the schematic side view of FIG. 2, according to which the embossing block 1 is affixed to the underside of a stamp 5 of a printing machine 6. The embossing block 1 or the pressure stamp 5 lies opposite the bed 7 of the printing machine, on which a flat body 8, with ribs or waves 9 disposed regularly on its surface, is placed. If the pressure stamp 5, to which the embossing plate 1 is attached, is moved downwards in the vertical direction 10 onto the bed 7, those waves or wave areas, with which the raised shapes 3, 4 come into contact, are pressed flat (compare also FIG. 4).

Figure 3:
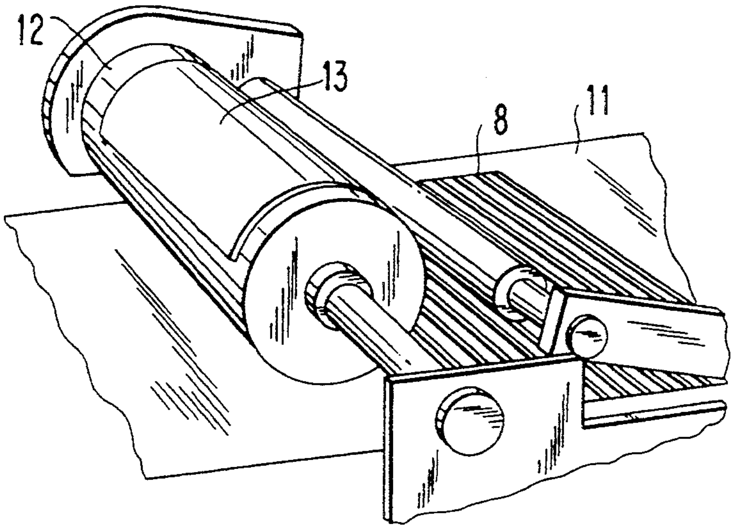

According to FIG. 3, a coloring process is carried out on the flat body as a further production step. On a conveyor belt 11, the flat body 8, embossed as shown in FIG. 2, is moved past a coloring roller 12, which is provided on its periphery with a coloring block 13. This process of moving past the coloring roller 12 is coordinated with the instantaneous peripheral position of the coloring block 13 in such a manner, that the latter comes into contact with the flat body 8 or those of its waves 9, which have not been pressed down and can transfer color to the crests or apexes 14 of the waves 9 (compare FIG. 5).

Figure 4:
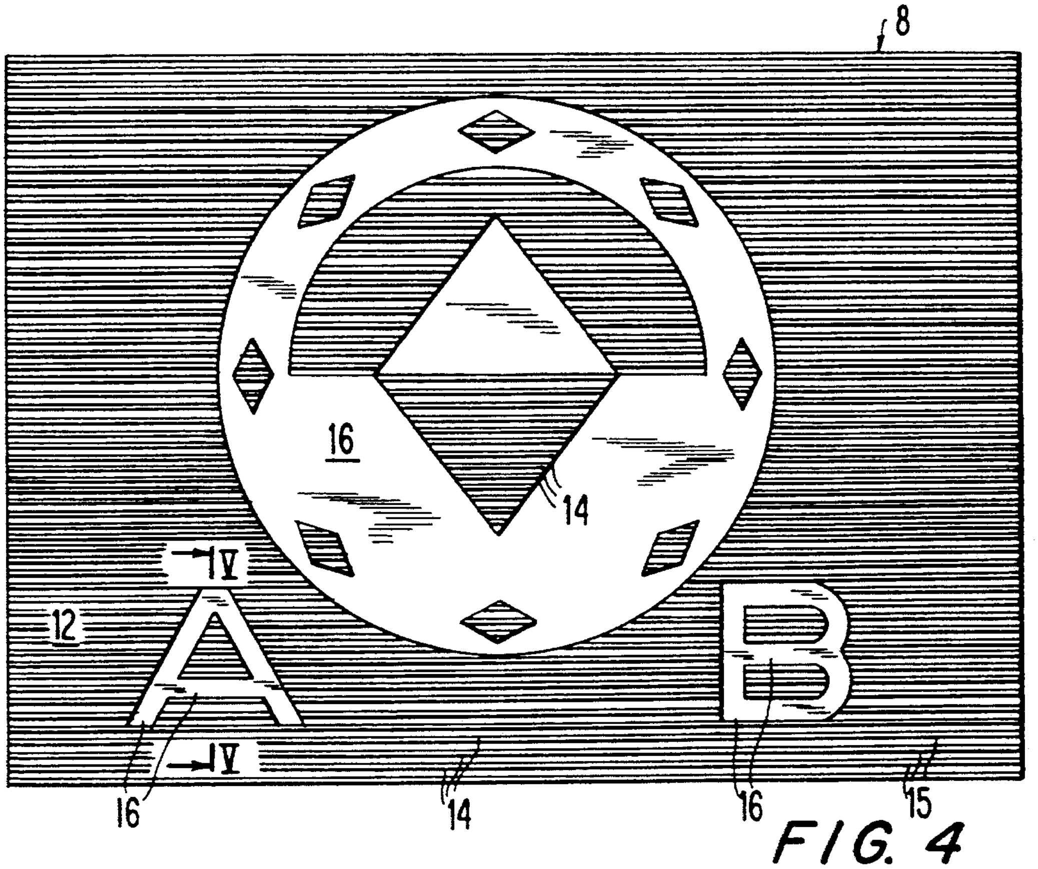
FIG. 4 shows a plan view of an inventive information carrier and FIG. 5 shows a section along the line V—V of FIG. 4.

The effect of this coloring process is shown in FIG. 4. The wave crests 14, which have not been depressed or have remained standing, are optically different from their adjoining surroundings. As a result, the human viewer can recognize the information reproduced in sharp contrast and with distinct contours.

Figure 5:
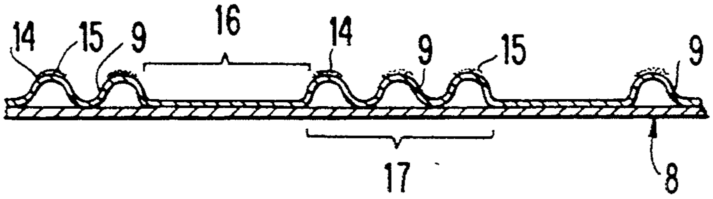

In the sectional representation of FIG. 5, it can be seen that regions 16, which have been pressed flat, alternate with regions 17, which have waves 9, corresponding to the shaping of the pattern 3 and the letters 4 on the base plate 2 of the embossing block 1. The apexes 14 of the waves 9 are capped with dye 15.

I claim:

1. A two-dimensional information carrier comprising a corrugated material formed with a plurality of undulating waves, some of said waves being pressed flat to form flat sections, said flat sections being delineated from the remaining part of the corrugated material which has not been pressed flat by demarcation lines, said demarcation lines defining the outline of an information pattern, said information pattern representing communicable information desired to be communicated to persons viewing the two-dimensional information carrier.

2. A two-dimensional information carrier according to claim 1 wherein said corrugated material comprises one flat sheet and one sheet with undulating waves, said sheet with undulating waves having a plurality of spaced U-shaped parts with each U-shaped part having a bottom secured to said flat sheet.

3. A two-dimensional information carrier according to claim 1 wherein said plurality of undulating waves comprise a plurality of alternately disposed raised projections and depressions, said raised projections being hollow thereby enabling said raised projections to be pressed flat to thereby form said line of demarcation between the raised projections which have been pressed flat and the juxtaposed raised projections which have not been pressed flat.

4. A two-dimensional information carrier according to claim 3 wherein said plurality of alternately disposed raised projections and depressions are elongated raised projections and elongated depressions which extend parallel to each another in a longitudinal direction, some of said demarcation lines extending perpendicular to said longitudinal direction.

5. A two-dimensional information carrier according to claim 3 wherein said plurality of alternately disposed raised projections and depressions are elongated raised projections and elongated depressions which extend parallel to each another in a longitudinal direction, some of said demarcation lines extending parallel to said longitudinal direction.

6. A two-dimensional information carrier according to claim 3 wherein said plurality of alternately disposed raised projections and depressions are elongated raised projections and elongated depressions which extend parallel to each another in a longitudinal direction, some of said demarcation lines extending at an acute angle relative to said longitudinal direction.

7. A two-dimensional information carrier according to claim 3 wherein said plurality of alternately disposed raised projections and depressions are elongated raised projections and elongated depressions which extend parallel to each another in a longitudinal direction, some of said demarcation lines having an arcuate configuration.

8. A two-dimensional information carrier according to claim 1 wherein said information pattern representing communicable information is formed by said demarcation lines and said pressed flat sections.

9. A two-dimensional information carrier according to claim 1 wherein said information pattern representing communicable information is formed by said demarcation lines and said unpressed undulating waves.

10. A two-dimensional information carrier according to claim 1 wherein said two-dimensional information carrier is a carrying bag having at least one side, said information pattern being formed on said at least one side of said carrying bag.

11. A two-dimensional information carrier according to claim 1 wherein said two-dimensional information carrier is a carrying bag having at least two sides, said information pattern being formed on each of said at least two sides.

12. A two-dimensional information carrier according to claim 1 wherein said two-dimensional information carrier comprises a receptacle.

13. A two-dimensional information carrier according to claim 1 wherein said two-dimensional information carrier comprises a carrier bag.

14. A two-dimensional information carrier according to claim 1 wherein said two-dimensional information carrier comprises a paper bag.

15. A two-dimensional information carrier according to claim 1 wherein said corrugated material is corrugated sheet metal.

16. A two-dimensional information carrier according to claim 1 wherein said corrugated material is corrugated board.

17. A two-dimensional information carrier according to claim 1 wherein said corrugated material is corrugated plastic sheeting.

18. A two-dimensional information carrier according to claim 1 further comprising coloring material on at least parts of the corrugated material which has not been pressed flat.

19. A two-dimensional information carrier according to claim 18 wherein said corrugated material which has not been pressed flat has crests, said coloring material being on said crests.

20. A method of forming an image on a carrier comprising providing a corrugated carrier material having a plurality of undulating waves, pressing some of the undulating waves to form flat sections and thereby forming lines of demarcation between said flat sections and the remaining part of the undulating waves which have not been pressed flat, said step of pressing some of the undulating waves to form said flat sections comprising pressing the undulating waves corresponding to a predetermined pattern such that the pressed flat sections correspond to said predetermined pattern, said predetermined pattern being defined by said lines of demarcation and said flat sections.

21. A method of forming an image on a carrier according to claim 20 wherein said step of pressing some of said undulating waves to form said flat sections comprises providing a block which has raised portions which is a mirror image of said predetermined pattern, disposing said block over said corrugated material, said steps of pressing some of said undulating waves to form said flat sections comprising pressing said block onto said corrugated material such that said raised portions in said block press the underlying undulating waves flat to thereby form said flat sections on said corrugated material.

22. A method of forming an image on a carrier according to claim 20 further comprising applying a coloring material to said undulating waves.

23. A method of forming an image on a carrier according to claim 22 wherein said undulating waves have crests and further comprising applying said coloring material to said crests of said undulating waves.

24. A method of forming an image on a carrier according to claim 20 further comprising coating at least parts of said undulating waves with a coloring material.

25. A method of forming an image on a carrier according to claim 20 wherein the remaining part of the undulating waves which has not been pressed flat has a plurality of crests, and applying a coloring material to said crests by partially immersing said crests in a bath containing said coloring material.

26. A method of forming an image on a carrier according to claim 20 wherein the remaining part of the undulating waves which has not been pressed flat has a plurality of crests, and effecting a rolling action with a roller containing a coloring material to at least partially coat said crests with said coloring material.

27. A method of making a two-dimensional image comprising the steps of:

providing a corrugated material;

selecting a two-dimensional image to be reproduced on said corrugated material;

pressing said corrugated material at selected areas corresponding to said image such that said pressed areas are substantially flattened out to thereby provide a line of demarcation between said pressed areas and the adjacent unpressed area;

said pressed areas and said lines of demarcation delineating the two-dimensional image.

28. A method of forming a two-dimensional image according to claim 27 wherein some of said unpressed areas are formed as islands completely surrounded by said pressed areas.

29. A method of forming a two-dimensional image according to claim 27 wherein some of said pressed areas are formed as islands completely surrounded by said unpressed areas.

30. A method of forming a two-dimensional image according to claim 27 wherein said corrugated material comprises a flat sheet and a sheet having undulating waves with said waves having a crest, said flat sheet having a first thickness and said sheet having said undulating waves having a second thickness, each of the undulating waves having a crest height which, before being flattened, is greater than the sum of said first and second thicknesses, said undulating waves upon being flattened having the crests thereof flattened such that the thickness of the corrugated material in the area where the crests are flattened is substantially equal to the sum of the first and second thicknesses.

31. A method of forming a two-dimensional image according to claim 27 wherein said image is a desired preconceived image which is formed by said pressed areas and said lines of demarcation.

32. A method of forming a two-dimensional image according to claim 27 wherein said image is a desired preconceived image which is formed by said unpressed areas and said lines of demarcation.

* * * * *